(12) United States Patent
Lessmann et al.

(10) Patent No.: US 12,494,977 B2
(45) Date of Patent: *Dec. 9, 2025

(54) SYSTEMS AND METHODS OF MONITORING AND CONTROLLING REMOTE ASSETS

(71) Applicant: Trideum Corporation, Huntsville, AL (US)

(72) Inventors: Kurt Lessmann, Madison, AL (US); Mark Riecken, Maitland, FL (US); Michael J. O'Connor, Harvest, AL (US)

(73) Assignee: Trideum Corporation, Huntsville, AL (US)

( * ) Notice: Subject to any disclaimer, the term of this patent is extended or adjusted under 35 U.S.C. 154(b) by 135 days.

This patent is subject to a terminal disclaimer.

(21) Appl. No.: 18/456,334

(22) Filed: Aug. 25, 2023

(65) Prior Publication Data

US 2023/0403215 A1     Dec. 14, 2023

Related U.S. Application Data

(63) Continuation of application No. 17/098,649, filed on Nov. 16, 2020, now Pat. No. 11,743,155.

(60) Provisional application No. 62/935,253, filed on Nov. 14, 2019.

(51) Int. Cl.
*H04L 43/065* (2022.01)
*G06F 9/54* (2006.01)
*H04L 43/50* (2022.01)

(52) U.S. Cl.
CPC ............ *H04L 43/065* (2013.01); *G06F 9/542* (2013.01); *H04L 43/50* (2013.01)

(58) Field of Classification Search
CPC ... H04L 43/065; H04L 43/50; H04L 41/0213; H04L 41/046; H04L 43/0817; G06F 9/542

See application file for complete search history.

(56) References Cited

U.S. PATENT DOCUMENTS

| | | | |
|---|---|---|---|
| 2018/0054376 A1 | 2/2018 | Hershey et al. | |
| 2019/0088156 A1* | 3/2019 | Choi | G06T 11/60 |
| 2019/0141063 A1* | 5/2019 | Hamdi | H04L 67/30 |

OTHER PUBLICATIONS

PCT Search Report and Written Opinion for PCT App. No. PCT/US20/60659, Dated Jul. 28, 2021.

* cited by examiner

*Primary Examiner* — Farzana B Huq
(74) *Attorney, Agent, or Firm* — Remenick PLLC

(57) ABSTRACT

Systems, methods, and computer readable media for monitoring distributed computing events are disclosed. The method includes defining parameters for a plurality of monitored assets, receiving status data for each monitored asset during the event, determining if each monitored asset's status is within the defined parameters during the event, providing an indication to a user if a monitored asset's status is outside the defined parameters, receiving instructions from the user for each monitored asset outside of the defined parameters, transmitting the instructions to the monitored asset outside of the defined parameters, executing the instructions on the monitored asset outside of the defined parameters, and providing an assessment of the event after the event concludes.

46 Claims, 7 Drawing Sheets

SYSTEMS AND METHODS OF MONITORING AND CONTROLLING REMOTE ASSETS

REFERENCE TO RELATED APPLICATIONS

This application is a continuation of U.S. application Ser. No. 17/098,649, filed Nov. 16, 2020, which claims priority to provisional application U.S. Provisional Application Ser. No. 62/935,253, filed Nov. 14, 2019, both entitled "SYSTEMS AND METHODS OF MONITORING AND CONTROLLING REMOTE ASSETS," a both are specifically and entirely incorporated by reference.

FIELD OF THE INVENTION

The invention is directed to systems and methods of monitoring and controlling system assets such as computer, data, and software application status of geographically distributed assets.

BACKGROUND OF THE INVENTION

As digital technologies evolve, distributed computing systems are becoming more prevalent. Typically, distributed computing systems have components or assets that are located on different networked computers, which communicate and coordinate their actions by passing messages and/or data to one another. The components interact with one another in order to achieve a common goal. Examples of distributed computing systems include, but are not limited to, peer-to-peer applications, multiplayer online games, service-oriented architecture (SOA) systems, military training simulations or live combat events, telecommunication networks, banking systems, medical facility operations, infrastructure industries (i.e. water and waste control, energy, oil and gas refining), emergency response systems, Internet of Things (IOT), and Cyber Physical Systems (CPS) technologies and other integrated systems. Depending on the requirements of a situation, assets may be added or removed from the distributed computing system as needed.

For example, military distributed simulations typically involve the working together of multiple, disparate computing devices, some of which are simulations. Military simulations are classified as live (L), virtual (V), or constructive (C). Computer games (G) are also considered part of these events. The configuration is often referred to as "LVC-G." Live (L) simulation is defined as a simulation involving real people operating real systems. As an example, the computing devices involved may be used to track individual weapon effects or location of the individuals within the simulation or a live aircraft conducting testing of an air to ground weapon system. Virtual (V) simulation is a simulation involving real people operating simulated systems. In this case, the computing devices may be simulated vehicles such as an aircraft or ground vehicle. Constructive (C) simulation is simulation involving simulated people operating simulated systems.

In order for these systems to work to their fullest potential, each component must be functioning properly. Establishing an integrated and operationally relevant training environment is currently a difficult and time-consuming endeavor. Therefore, there is a need for systems and methods of monitoring the connected devices, reporting issues, and providing solutions to those issues.

SUMMARY OF THE INVENTION

The present invention overcomes the problems and disadvantages associated with current strategies and designs and provides new devices and methods for monitoring and controlling system assets.

One embodiment of the invention is directed to a method for monitoring distributed computing events. The method comprises the steps of defining parameters for a plurality of monitored assets, receiving status data for each monitored asset during the event, determining if each monitored asset's status is within the defined parameters during the event, providing an indication to a user if a monitored asset's status is outside the defined parameters, receiving instructions from the user for each monitored asset outside of the defined parameters, transmitting the instructions to the monitored asset outside of the defined parameters, executing the instructions on the monitored asset outside of the defined parameters, and providing an assessment of the event after the event concludes.

Preferably, the event is a simulated training event. In a preferred embodiment, the monitored assets are at least one of computers, laptops, desktops, rack-mounted, virtualized, or Internet of Things (IoT) devices, smartphones, tablets, network devices, software-defined radios, unmanned aerial vehicles (UAVs), ground control stations, tactical solutions, training solutions, software applications, network devices, and data transmission devices. Preferably, the step of defining parameters for a plurality of monitored assets is one of a new set of parameters or is based on parameters from a previous event. The parameters preferably include at least one of what and when monitored assets are involved in the event, specifications of each monitored asset, what each monitored asset should be doing during the event, how the monitored assets communicate, central processing unit (CPU) utilization, memory utilization, hardware performance, software performance, and data file and application version information.

The method preferably further comprises the step of installing data gathering agents on each monitored asset. The method preferably further comprises the step of testing each monitored asset prior to an event. The method preferably further comprises the step of monitoring network data. The method preferably further comprises the step of monitoring for and reporting at least one of out of bounds system performance, incorrect data, potential cybersecurity issues, unexpected data on the network, and unexpected IP addresses. In a preferred embodiment, the assessment of the event includes at least one of number of times and/or durations a monitored asset exceeded some parameters, and trends for events, sites, or monitored assets. The assessment is preferably organized by at least one of overall event, by site, and by individual monitored asset.

Preferably, the step of determining if each monitored asset's status is within the defined parameters during the event includes determining if each monitored asset's status is at or above a threshold for the parameters, below the threshold for the parameter but within an acceptable range below the threshold, or exceeding the acceptable range below the threshold. The method preferably further comprises the step of providing different indications for each monitored asset below the threshold for the parameter but within an acceptable range below the threshold, and each monitored asset exceeding the acceptable range below the threshold.

The method preferably further comprises the step of displaying event information to the user. Preferably, the event information includes at least one of status and trends of events, sites, and monitored assets, geographical locations of sites, events currently in the database, event participant locations, and network diagrams. In a preferred embodiment, the data is at least one of Security Information and Event Management (SIEM) data, Simple Network Management Protocol (SNMP) data, High Level Architecture (HLA) data, Distributed Interactive Simulation (DIS) data, and Data Distribution System (DDS) data. Preferably, the instructions include at least one of starting or stopping a process or application, installing software updates, and steps to remedy monitored asset outside of the defined parameters. The method is preferably a cloud-based deployment or an on-site deployment.

Another embodiment of the invention is directed to a non-transitory computer readable media for monitoring distributed computing events. The computer readable media directing a central processor to define parameters for a plurality of monitored assets, receive status data for each monitored asset during the event, determine if each monitored asset's status is within the defined parameters during the event, provide an indication to a user if a monitored asset's status is outside the defined parameters, receive instructions from the user for each monitored asset outside of the defined parameters, transmit the instructions to the monitored asset outside of the defined parameters, and provide an assessment of the event after the event concludes.

In a preferred embodiment, the event is a simulated training event. Preferably, the monitored assets are at least one of computers, laptops, desktops, rack-mounted, virtualized, or Internet of Things (IoT) devices, smartphones, tablets, network devices, software-defined radios, unmanned aerial vehicles (UAVs), ground control stations, tactical solutions, training solutions, software applications, network devices, and data transmission devices. Preferably, the parameters are one of a new set of parameters or is based on parameters from a previous event. The parameters preferably include at least one of what and when monitored assets are involved in the event, specifications of each monitored asset, what each monitored asset should be doing during the event, how the monitored assets communicate, central processing unit (CPU) utilization, memory utilization, hardware performance, software performance, and data file and application version information.

The computer readable media preferably further directs the central processor to install data gathering agents on each monitored asset. Preferably, the computer readable media further directs the central processor to test each monitored asset prior to an event. Preferably, the computer readable media further directs the central processor to monitor network data. In a preferred embodiment, the computer readable media further directs the central processor to monitor for and report at least one of out of bounds system performance, incorrect data, potential cybersecurity issues, unexpected data on the network, and unexpected IP addresses.

Preferably, the assessment of the event includes at least one of number of times and/or durations a monitored asset exceeded some parameters, and trends for events, sites, or monitored assets. The assessment is preferably organized by at least one of overall event, by site, and by individual monitored asset. Preferably, the determination of each monitored asset's status is a determination of if the monitored asset's status is within the defined parameters during the event includes determining if each monitored asset's status is at or above a threshold for the parameters, below the threshold for the parameter but within an acceptable range below the threshold, or exceeding the acceptable range below the threshold.

In a preferred embodiment, the computer readable media further directs the central processor to provide different indications for each monitored asset below the threshold for the parameter but within an acceptable range below the threshold, and each monitored asset exceeding the acceptable range below the threshold. Preferably, the computer readable media further directs the central processor to display event information to the user. The event information preferably includes at least one of status and trends of events, sites, and monitored assets, geographical locations of sites, events currently in the database, event participant locations, and network diagrams. Preferably, the data is at least one of Security Information and Event Management (SIEM) data, Simple Network Management Protocol (SNMP) data, High Level Architecture (HLA) data, Distributed Interactive Simulation (DIS) data, and Data Distribution System (DDS) data. Preferably, the instructions include at least one of starting or stopping a process or application, installing software updates, and steps to remedy monitored asset outside of the defined parameters.

Another embodiment of the invention is directed to a system for monitoring distributed computing events. The system comprises a plurality of monitored assets, each monitored asset adapted to transmit the monitored asset's status information data and receive instructions; a central processing unit adapted to receive status information data from each monitored asset and send instructions to each monitored asset; and software executing on the central processing unit. The software defines parameters for the plurality of monitored assets, receives status data for each monitored asset during the event, determines if each monitored asset's status is within the defined parameters during the event, provides an indication to a user if a monitored asset's status is outside the defined parameters, receives instructions from the user for each monitored asset outside of the defined parameters, transmits the instructions to the monitored asset outside of the defined parameters, and provides an assessment of the event after the event concludes.

In a preferred embodiment, the event is a simulated training event. Preferably, the monitored assets are at least one of computers, laptops, desktops, rack-mounted, virtualized, or Internet of Things (IoT) devices, smartphones, tablets, network devices, software-defined radios, unmanned aerial vehicles (UAVs), ground control stations, tactical solutions, training solutions, software applications, network devices, and data transmission devices. The parameters are preferably one of a new set of parameters or is based on parameters from a previous event. Preferably, the parameters include at least one of what and when monitored assets are involved in the event, specifications of each monitored asset, what each monitored asset should be doing during the event, how the monitored assets communicate, central processing unit (CPU) utilization, memory utilization, hardware performance, software performance, and data file and application version information.

The software preferably installs data gathering agents on each monitored asset. Preferably, the software tests each monitored asset prior to an event. In a preferred embodiment, the software monitors network data. Preferably, the software monitors for and reports at least one of out of bounds system performance, incorrect data, potential cybersecurity issues, unexpected data on the network, and unexpected IP addresses. The assessment of the event preferably includes at least one of number of times and/or durations a monitored asset exceeded some parameters, and trends for events, sites, or monitored assets. Preferably, the assessment is organized by at least one of overall event, by site, and by individual monitored asset.

Preferably, the determination of each monitored asset's status is a determination of if the monitored asset's status is within the defined parameters during the event includes determining if each monitored asset's status is at or above a threshold for the parameters, below the threshold for the parameter but within an acceptable range below the threshold, or exceeding the acceptable range below the threshold. In a preferred embodiment, the software provides different indications for each monitored asset below the threshold for the parameter but within an acceptable range below the threshold, and each monitored asset exceeding the acceptable range below the threshold.

Preferably, the software displays event information to the user. The event information preferably includes at least one of status and trends of events, sites, and monitored assets, geographical locations of sites, events currently in the database, event participant locations, and network diagrams. In a preferred embodiment, the data is at least one of Security Information and Event Management (SIEM) data, Simple Network Management Protocol (SNMP) data, High Level Architecture (HLA) data, Distributed Interactive Simulation (DIS) data, and Data Distribution System (DDS) data. Preferably, the instructions include at least one of starting or stopping a process or application, installing software updates, and steps to remedy monitored asset outside of the defined parameters.

Other embodiments and advantages of the invention are set forth in part in the description, which follows, and in part, may be obvious from this description, or may be learned from the practice of the invention.

BRIEF DESCRIPTION OF THE DRAWINGS

There are shown in the drawings, embodiments which are presently preferred. It is expressly noted, however, that the invention is not limited to the precise arrangements and instrumentalists shown.

DESCRIPTION OF THE INVENTION

Figure 1:
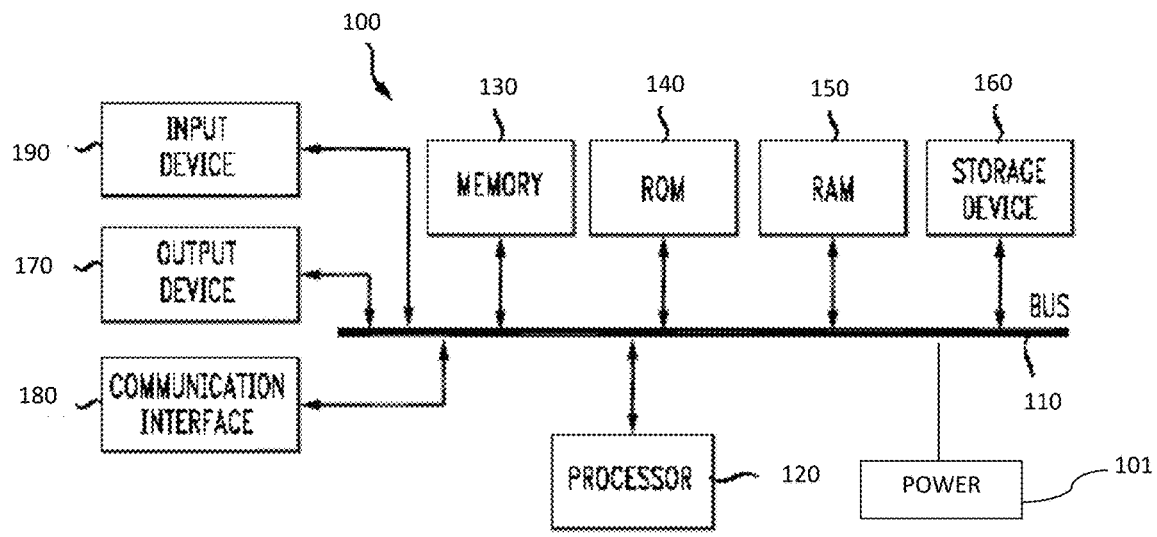
FIG. 1 is a schematic of an embodiment of a computing device.

FIG. 1 depicts a schematic of a preferred embodiment of a computing device 100. Device 100 preferably includes a power source 101. For example, power source 101 may be a battery, a chemical power source, a solar energy converter, a power converter to receive power from a wall receptacle or the like, a mechanical power source, or source of power.

Power source 101 is preferably used to supply power to the remaining components of computing device 100. Computing device 100 preferably further includes an integrated circuit (i.e. a system on a chip (SoC)). The SoC preferably integrates multiple components of a computer or other electronic system into a single chip. It may contain digital, analog, mixed-signal, and radio-frequency functions all on a single chip substrate. The SoC preferably incorporates one or more of a central processing unit (CPU), a graphics processing unit (GPU), and a system bus 1 that couples various system components including the system memory 130, dynamic random access memory (RAM) 150 and flash memory 160, to the SoC. The system bus may be one of several types of bus structures including a memory bus or memory controller, a peripheral bus, or a local bus using one of a variety of bus architectures. A basic input/output (BIOS) stored in flash memory 160 or the like, may provide the basic routine that helps to transfer information between elements within computing device 100, such as during start-up. The drives and the associated computer readable media provide nonvolatile storage of computer readable instructions, data structures, program modules and other data for computing device 500. The basic components are known to those of skill in the art and appropriate variations are contemplated.

Although the exemplary environment described herein employs flash memory, it is appreciated by those skilled in the art that other types of computer readable media which can store data that are accessible by a computer, such as magnetic cassettes, hard drives, digital versatile disks, cartridges, random access memories (RAMs) 150, read only memory (ROM) 140, a cable or wireless signal containing a bit stream and the like, may also be used in the exemplary operating environment.

Computing device 100 further preferably includes a networking device 180. Networking device 180 is able to connect to, for example, the Internet, one or more Local Area Networks ("LANs"), one or more Metropolitan Area Networks ("MANs"), one or more Wide Area Networks ("WANs"), one or more Intranets, etc. Networking device 180 may be capable of connecting to wireless Bluetooth devices (e.g. a keyboard or a mouse). Preferably, networking device 180 is a wireless networking device (e.g. Wi-Fi), however hard-wired networks can be coupled to networking device 180 (e.g. ethernet). Furthermore, networking device 180 may also connect to distributed computing environments where tasks are performed by local and remote processing devices that are linked (either by hardwired links, wireless links, or by a combination thereof) through a communications network. In a distributed computing environment, program modules may be located in both local and remote memory storage devices.

To enable user interaction with computing device 100, there is preferably an input receiving device 190. Input receiving device 190 can receive input from a number of input mechanisms, such as a microphone for speech, a touch-sensitive screen for gesture or graphical input, a keyboard, a mouse, motion input, RJ-45, USB, and so forth. In some instances, multimodal systems enable a user to provide multiple types of input to communicate with the computing device 100. There is no restriction on the invention operating on any particular hardware arrangement and therefore the basic features here may easily be substituted for improved hardware or firmware arrangements as they are developed.

Computing device 100 further preferably includes at least one output port 170. Output port 170 connects computing device 100 to a TV, speaker, projector, or other audio-visual device. Preferably, output port 170 is a HDMI port, optical audio port, serial port, USB port, networking port, s-video port, coaxial cable port, composite video, composite audio, and/or VGA port. In preferred embodiments, computing device 100 may also include additional auxiliary components (e.g. power management devices or digital audio convertors).

For clarity of explanation, the illustrative system embodiments are presented as comprising individual functional blocks. The functions these blocks represent may be provided through the use of either shared or dedicated hardware, including, but not limited to, hardware capable of executing software. For example, the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large-scale integration (VLSI) hardware embodiments, as well as custom VLSI circuitry in combination with a general purpose DSP circuit, may also be provided.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a computer, specialty computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

It has been surprisingly discovered that early identification of issues can significantly reduce live, virtual, and/or constructive training event timelines and risk. The system collects and translates raw enterprise-level information into recommended actions to ensure the readiness of an environment. The system is preferably a user-centered decision aide that enable rapid identification and prioritization of issues that, if left unresolved, could cause significant delays and unexpected behaviors in complex environments. Users are preferably able to avoid delays which positively impacts the schedule, cost, and performance of the intended activities. A system dashboard preferably provides enterprise-level views of the environment to easily visualized dependencies among complicated and complex data sets and allows users to quickly identify and rectify potential issues. The dashboard provides situational awareness across the entire environment which allows the user to make informed decisions on the readiness of the systems involved in the event. The system of the invention preferably supports distributed computing events. The system is preferably designed to support distributed simulation events that are typically military training exercises but can support any distributed computing event that requires careful monitoring of the status of distributed computing assets. The system was developed to address the need to monitor a diversity of computing devices that make up complex, distributed training and test and evaluation (T&E) events. The failure or poor performance of any given device may or may not have severe consequences for the mission. The system is preferably designed to help event managers better understand the status of all of the computing devices involved and address concerns in a timely and effective manner.

The system preferably collects metadata about system assets and uses an analysis engine to determine an overall status by system asset as well as by simulated entity. Status ranges from functioning as expected, to warnings, to alerts requiring immediate attention by an operator. The system preferably translates raw information into recommended actions to ensure the readiness of the computing environment without the need for network, computer and simulation experts. The system preferably significantly reduces the time and risk associated with establishing an integrated and properly configured networked computing environment.

Figure 2:
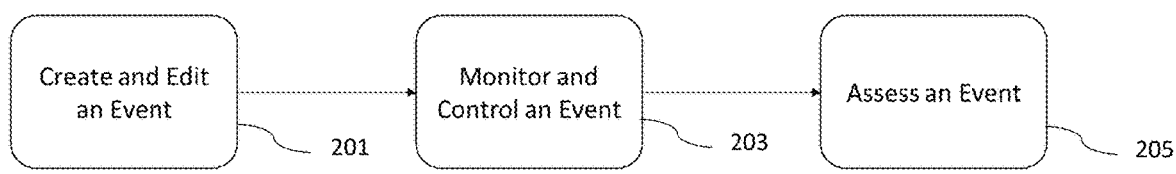
FIG. 2 is a flow chart of an embodiment of the schedule of an event.

FIG. 2 depicts an embodiment of a flow chart of the schedule of an event. As used herein, an event may be a collection of data about a distributed computing activity such as a military LVC-G training or test activity (although it could be any distributed computing activity) typically involving LVC applications. An event may be a one-time occurrence, recurring, on-going, for a specified period of time, and combinations thereof. Preferably, the lifecycle of an event starts with creating and/or editing the event 201. An event may be created from scratch or may be modified based on a previous event. Preferably, users are able to access functions to create, read, update, and delete (CRUD) event data and metadata, including monitoring service data and metadata. Event data may include, but are not limited to, specific computer names, computer addresses, operating systems, and application programs that are running on the computers. Event metadata may also include information about the event itself such as geographic locations, expected duration, and purpose.

Once an event is created, the system preferably monitors and controls the event 203. As MAs come online, the system is preferably able to assess each MA to ensure that the MA is performing properly. Preferably, users are able to monitor systems and data associated with a given event in real or near real time. The types of events include, but are not limited to, distributed computing activities such as military LVC-G training or test events. Typical Monitored Assets (MAs) include computers (i.e. laptops, desktops, rack-mounted, virtualized, or Internet of Things (IoT) devices), smartphones, tablets, network devices, software-defined radios, unmanned aerial vehicles (UAVs), ground control stations, tactical solutions, training solutions (e.g. I-Miles) or other devices in communication with the system. Furthermore, an MA can be a software application, a network device, or other data transmission capable device.

Figure 3:
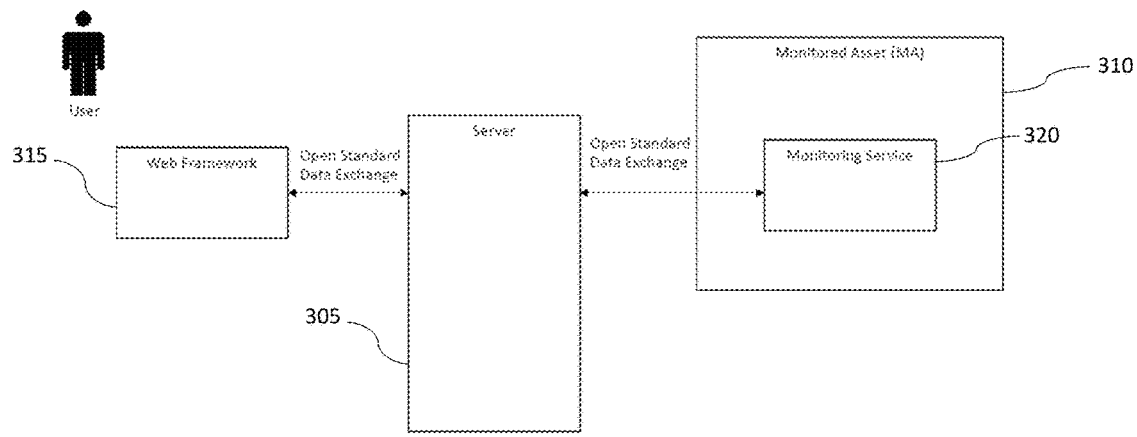
FIG. 3 is a schematic of an embodiment of a monitoring service on a monitored asset.

An MA is preferably not part of the system. Instead, the system preferably provides a mechanism to retrieve information from the MA. However, in other embodiments, the MAs are integrated into the system. The mechanism is preferably either software installed on the MA (as a software agent) or is an agentless mechanism such as Simple Network Management Protocol (SNMP). Data types monitored may include data relevant to the event, but typically include central processing unit (CPU) utilization, memory utilization, data file and application version information. The service (e.g., a software agent) appropriate for each MA will collect and transmit to the system server the monitored data. Monitored data may include hardware performance (e.g., memory utilization), software performance (e.g., software application status), and configuration data (e.g., operating system version or application version). For example, as shown in FIG. 3, each MA 310 has a monitoring service 320. The monitoring service 320 sends data and receives instructions from the system server 305, which, in turn, is in data communication with the system framework 315. The system preferably reviews all data from and to multiple sources going across the network to make sure everything is working as expected. The system is preferably able to scan for and report anomalies which may include out of bounds system performance, incorrect data, or potential cybersecurity issues (i.e., unexpected data on the network), and/or unexpected IP addresses on the network.

After an event has ended, or, in some cases, as times during an event, the system preferably provides an assessment of the event 205. Preferably, users are able to summarize and assess an event against pre-defined metrics. An assessment is preferably a summary of how well the event was or is being executed in comparison to pre-defined metrics. Metrics may include the number of times and durations a monitored asset (MA) exceeded some threshold for expected operations (e.g., exceeded a pre-defined threshold for CPU or memory utilization). Assessment information is organized by the overall event, by site, and by individual MAs.

Figure 4:
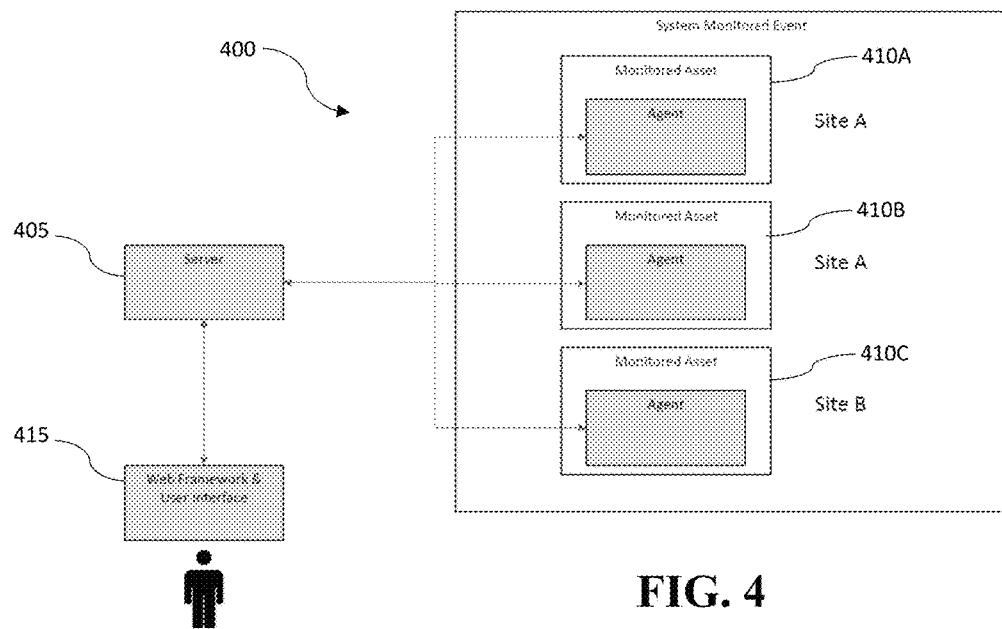
FIG. 4 is a schematic of an embodiment of the system.

FIG. 4 depicts an embodiment of a top-level view of the system 400 in which the Server 405 is connected to three monitored assets (MA) 410A-C at two different geographic sites A and B. While three MAs are shown any number of MAs can be monitored by the system. Furthermore, the system can monitor MAs in multiple geographic areas. A system 400 user can preferably monitor and control activity through the Web Framework and User Interface 415.

Event Creation and Editing

In order to successfully monitor an event, preferably the parameters of the event must first be created and/or edited. By knowing the parameters of an event before the event begins, the system knows what to monitor, when errors occur, and how significant the errors are. The significance of the errors is preferably based on predetermined tolerances. The parameters may include, but are not limited to, what and when assets are involved in the event, the specifications of each asset, what each asset should be doing during the event, and how the assets communicate. An editor is preferably used to either create new metadata files or edit existing ones. Each event is preferably built from scratch or is edited based on preexisting events. While events may be repeated, each event may have unique features that are preferably known a priori so that the system knows what to look for during the event. Preferably, there are two types of metadata files: Event Description Files and Monitoring Service files. For example, an Event Description File may contain following content: Event Name, Date Time Group (DTG) information, Customer, Site names and locations, network configuration, specific MA listing, configurations and point of contact (POC). Furthermore, the Event Description File may have information required by industry standards, such as the Simulation Interoperability Standards Organization (SISO) Federation Engineering Agreements Template (FEAT). The Monitoring Service Files preferably provide service configuration data and service behavior data using a standard data exchange mechanism such as eXtended Markup Language (XML) or Javascript Object Notation (JSON). Service configuration data preferably includes data specific to the type of MA such that the Monitoring Service is compatible with the operating system of the MA. Service behavior data preferably includes software instructions on what data to return to the system server based on the status of the monitored parameters of the MA.

Figure 5:
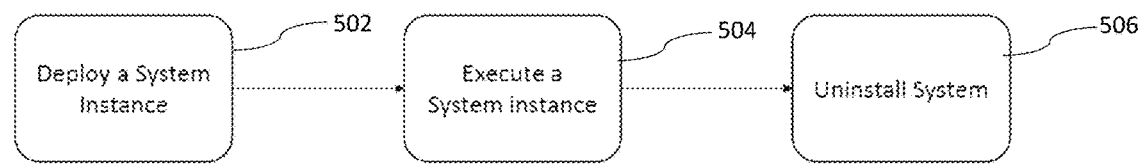
FIG. 5 is a schematic of an embodiment of the system's lifecycle.

MAs typically contain system services such as a software agent. Software that is part of the system is shown in the shaded portion of FIG. 4. The software may be pre-installed on the MA or may be added later as the MA interfaces with the system. For example, as shown in FIG. 5, in preparation for an event, an instance of the agent may be deployed on an MA 502. The system then executes the event 504 and the software is uninstalled from the MA 506. In other embodiments, where an MA may be used in multiple events, the software may remain on the MA. Preferably the software agent is chosen to be appropriate for each MA.

A user preferably accesses an editor to creates or edit Monitoring Service files for each event. The Monitoring Service files preferably contain information about the nature of the device itself, performance thresholds (e.g., CPU usage), required data files, and names and versions of software applications that are expected to be on the MA. A user may also access the editor to create or edit an Event Description file. The Event Description file preferably contains information about the event including the date of the event, the locations of the event, and the list of MAs that are to be included in the event. Preferably an event description file is consumed by Analysis Capability software in conjunction with information coming from the Monitoring Services to provide relevant information to the user. The system preferably stores and manages the metadata files for each event. Preferably, the system can maintain data for and monitor multiple events simultaneously. For example, a user can be creating and editing data and metadata associated with one event while simultaneously monitoring and controlling a separate event (i.e. via a separate browser tab).

Event Monitoring and Control

Based on information from the Event description file and information from deployed monitoring services, the system preferably performs analysis, assigns values to multiple parameters, and displays that processed information to the user. The analysis capabilities may include (1) determining if an MA is in or out of a predetermined tolerance based on user-defined tolerance levels and (2) determining trends for events, sites, or MAs. The status of each MA is preferably monitored by comparing the appropriate data from one or more MA to user-defined thresholds and alert conditions set in metadata. The trend determinations are preferably accomplished by collecting data over time as well as across sites and MAs to discover trends such as failure rates or reliability figures.

The Analysis Capability preferably uses data from Event Configuration files and Monitored Assets to determine the level of operability of Events, Sites, Applications, and individual files or computer system parameters associated with MAs. The Analysis Capability employs conditional test such as the following:

IF (EVENT CONDITIONS are OPERABLE) THEN EVENT STATUS SET TO OPERABLE
IF (EVENT CONDITIONS are MARGINAL) THEN EVENT STATUS SET TO MARGINAL
IF (EVENT CONDITIONS are NON-OPERABLE) THEN EVENT STATUS SET TO NON-OPERABLE Similar relationships hold for Site Conditions, Application Conditions, and File Conditions. Preferably the thresholds are predetermined prior to an event. The terms OPERABLE, MARGINAL, and NON-OPERABLE may be defined as follows:

OPERABLE=Meets or exceeds conditions set in Event Configuration file for the Event, Site, Application, or File in question
MARGINAL=Conditions fall within a band of values less than OPERABLE, but greater than NON-OPERABLE for the Event, Site, Application, or File in question
NON-OPERABLE=Conditions fall below a threshold of conditions set in Configuration file for the Event, Site, Application, or File in question For "MARGINAL" and "NON-OPERABLE" conditions, specific alerts, warnings, or other information with the appropriate level of detail will preferably be provided as feedback. An example of a MARGINAL condition is CPU usage exceeding its expected threshold. This condition may be tolerable although it may merit attention by the user. An example of a NON-OPERABLE condition is a CPU that is no longer responding.

The system preferably displays information including, but not limited to, status and trends of events, sites, and MAs. Additionally, users may opt for the display of the location of sites by global map, all events currently in the database (allowable by current logged in role and authenticated identity), and the status and trends of events, sites, and MAs. For example, the user's display may include geographic maps that indicate event participant locations and network diagrams.

Preferably, the system can ingest data from external system sources to use as part of the analysis algorithms. Specific types of external system data and sources include, but are not limited to, Security Information and Event Management (SIEM) data, Simple Network Management Protocol (SNMP) data as well as interoperability solutions such as High Level Architecture (HLA), Distributed Interactive Simulation (DIS), and Data Distribution System (DDS).

Preferably, the system includes an Intelligent Assistant. The Intelligent Assistant is preferably able to suggest parameters and parameter values to monitor based on similar events, sites, or MAs current or past. The system is preferably able to start or stop certain processes or applications on MAs whose configuration data is included in the appropriate configuration files and filter data from MAs. Preferably, the system can send status and trends to external systems through SMS messages. During an event, the system preferably provides a mechanism for users to update MA software items to meet desired environment configurations via a Configuration Service. The system can alert the appropriate user with information about the specific out of tolerance situation, along with the steps to remedy the problem. If the user chooses to deploy the fix, the system may be able to push a software fix across the network to one or more MAs that are out of tolerance.

The system preferably is able to index and archive data, and perform standard database operations on multiple types of data including event-specific data and customer-specific data. The system's database preferably maintains time-ordered data and associates the data with a given MA, site, or event. The database can support trend analysis or causal analysis (i.e., attributing a cause to a failure) relating to conditions that trigger out of tolerance alerts.

The system preferably uses standard web-based browser technology, so it can be accessed by any networked device capable of running a modern browser (including most PCs, laptops, or tablets). The web-based capability that can be deployed in the cloud as well as on premise. For example, FIG. 6A shows a cloud-based deployment while FIG. 6B shows an on-site deployment of the system.

Figure 6A:
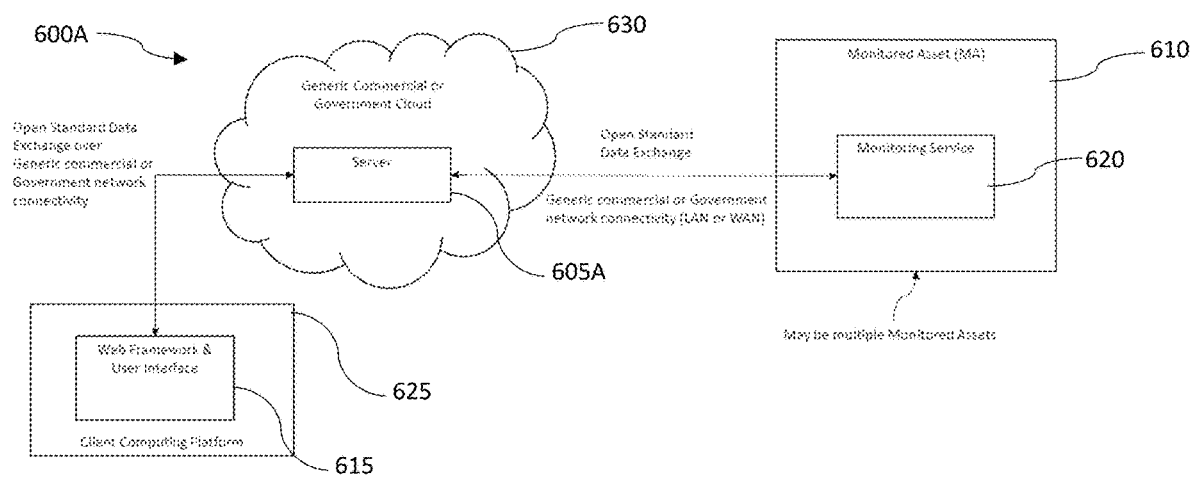
FIG. 6A is a schematic of a cloud-based embodiment of the system.
Figure 6B:
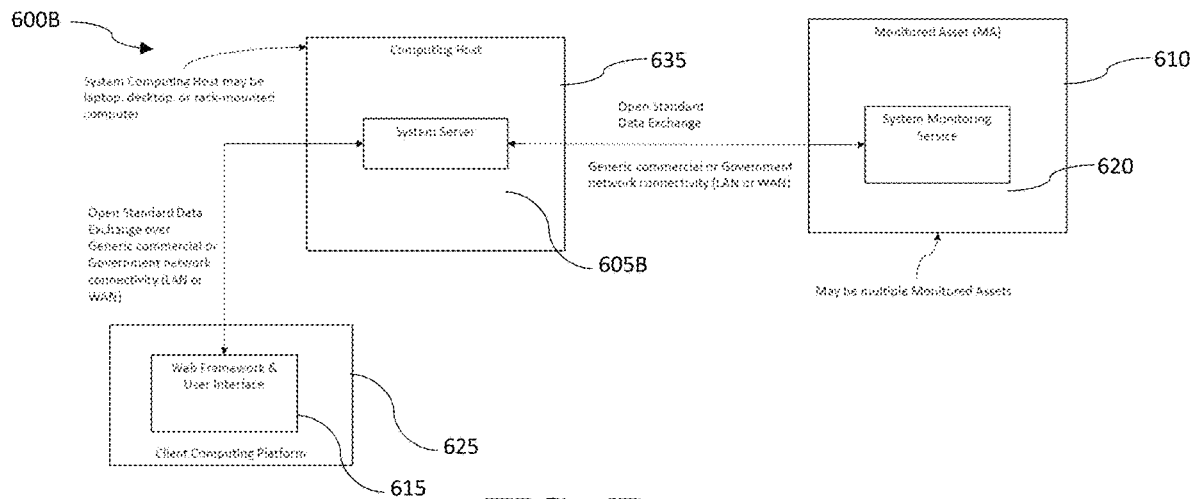
FIG. 6B is a schematic of an on-site embodiment of the system.

As can be seen in FIGS. 6A and 6B both the cloud-based deployment 600A and the on-site deployment 600B have at least one MA 610 with a monitoring service agent 620. Each monitoring service agent 620 of each MA 610 is in data communication with a server 605. The server 605 is preferably in data communication with the web framework and user interface 615 running on a client computing platform 625. The communications may be a generic commercial connection, a government network, or another specific network (i.e. LAN or WAN). However, in cloud-based deployment 600A, server 605A is a cloud-based (either commercially available or government based) server 630, and in on-site deployment 600B, server 605B is a computer host 635. For example, computer host 635 may be a laptop, desktop, rack-mounted computer, or another on-site computing device.

Figure 7:
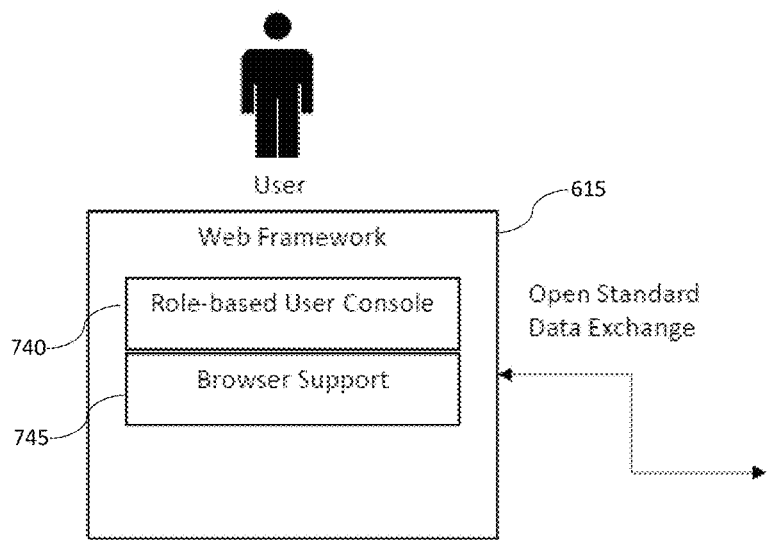
FIG. 7 is a schematic of an embodiment of a web framework and user interface.
Figure 8:
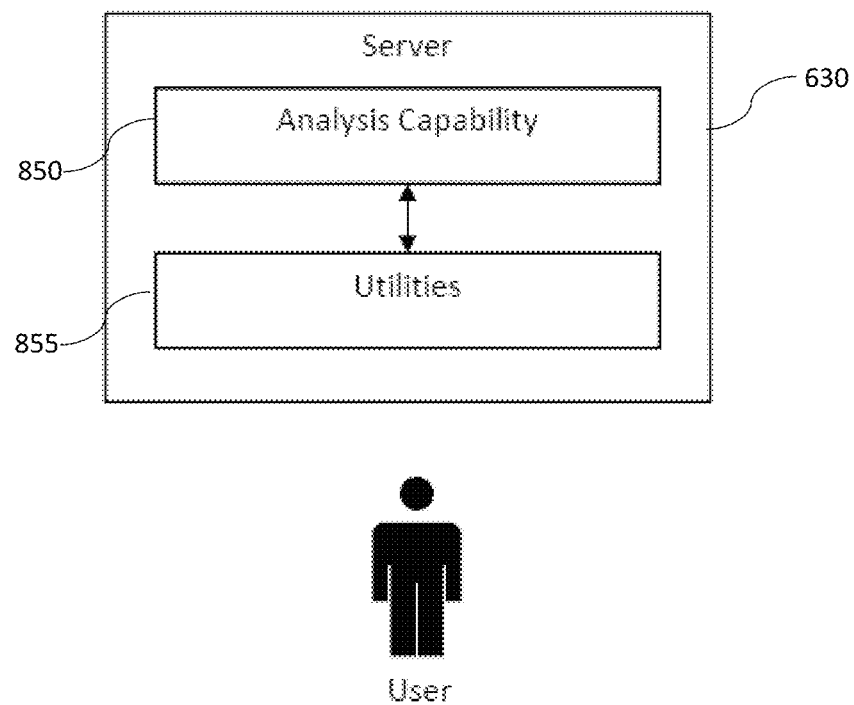
FIG. 8 is a schematic of an embodiment of a server.

FIG. 7 depicts an embodiment of the web framework and user interface 615. Preferably, web framework and user interface 615 has a role-based user console 740 and browser support 745. Web framework and user interface 615 preferably communicates with server 630 through an Open Standard Data Exchange Mechanism (such as Representational State Transfer (REST)). FIG. 8 depicts an embodiment of server 630. Server 630 preferably consists of two main components: the analysis capability component 850 and the utilities component 855. Analysis capability component 850 preferably communicates with utilities component 855 via an open standards communication mechanism.

Figure 9:
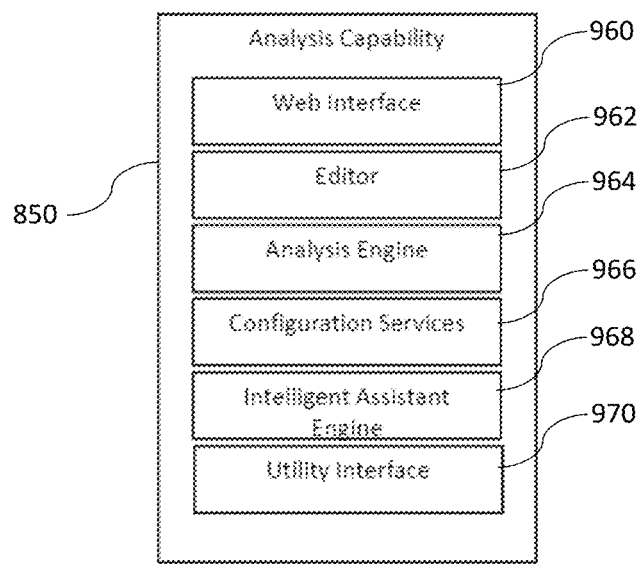
FIG. 9 is a schematic of an embodiment of the elements of an analysis capability component.

FIG. 9 depicts an embodiment of the elements of analysis capability component 850. The elements preferably include: a web interface 960 that facilitates the data flow between web framework and user interface 615 and server 630; an editor 962 that allows for creating, reading, updating, and deleting (CRUD) event configuration files, and monitoring service metadata files, as well as other user-defined data and metadata; an analysis engine 964 that assembles the various data and metadata from all sources and applies algorithms that drive the user interface, especially in terms of MA and event status; configuration services 966 that, under appropriate circumstances, retrieves and configures data from recognized repositories or software patches that can be pushed out to the appropriate MA; an intelligent assistant engine 968 that assists the user (via communication with the web interface) in creating or editing event configurations; and a utility interface 970 that provides an interface mechanism to the server utilities component 855.

Figure 10:
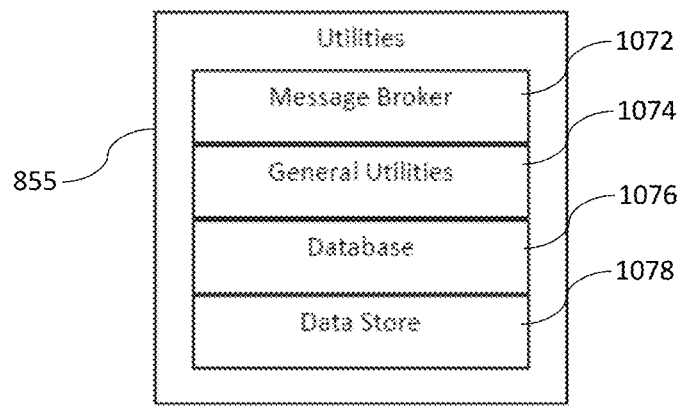
FIG. 10 is a schematic of an embodiment of the elements of a utility component.

FIG. 10 depicts an embodiment of the elements of utilities component 855. The elements preferably include: a message broker 1072 that provides a standards-based mechanism for internal server communications; general utilities 1074 that provides a variety of file, directory, and general server capabilities; one or more databases 1076 that organize multiple schemas for multiple purposes; and one or more data stores 1078 that store data in accordance with the database schemes.

Figure 11:
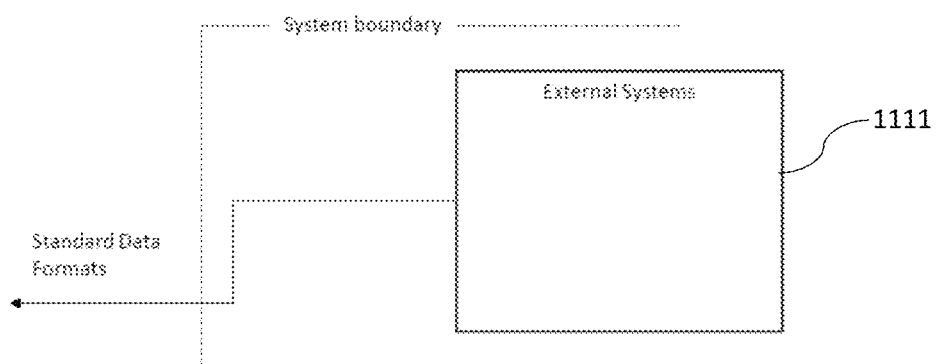
FIG. 11 is a schematic of an embodiment of an external system interface.
Figure 13:
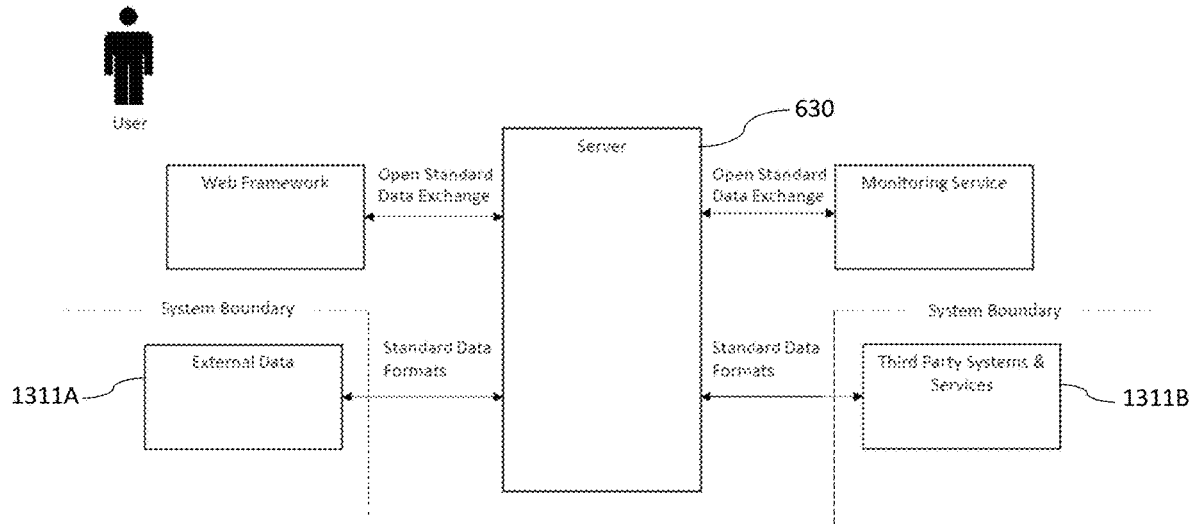
FIG. 13 is a schematic of an embodiment of top-level components and interfaces illustrating system boundaries and external devices.
Figure 14:
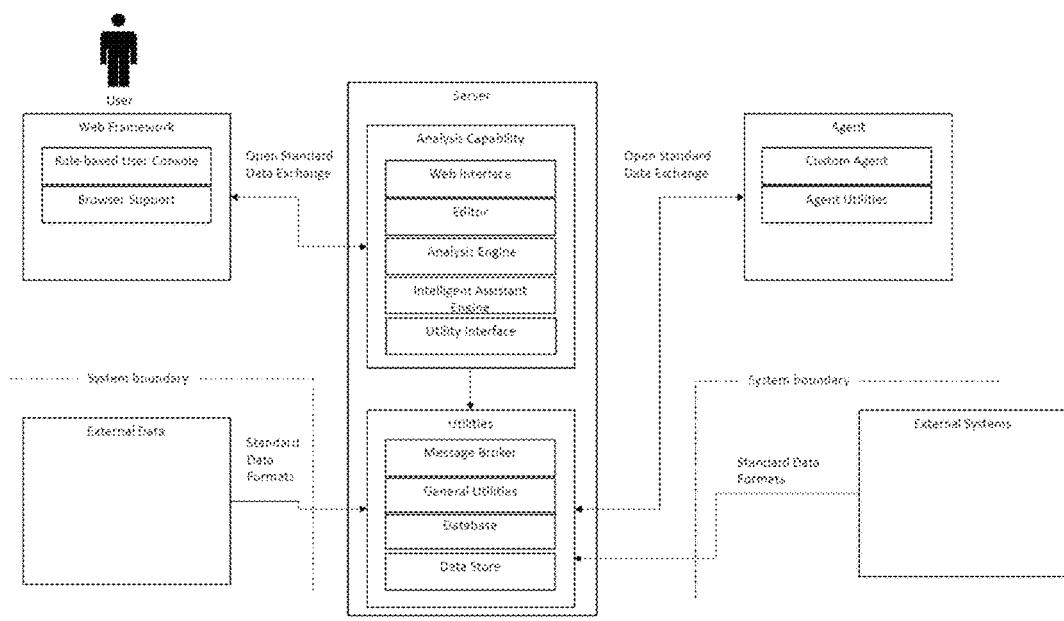
FIG. 14 is a schematic of an embodiment of the entire system including the subcomponents.

The system preferably ingests data from external systems 1111 in Standard Data Formats (e.g., XML, DDS) sent to the server 630, see FIG. 11. Examples of external systems and external system data that the system is capable of interfacing with include: Linux Update Service, Windows Update Service, NESSUS Security Technical Implementation Guide (STIG) Compliance Service, and Security Information and Event Management (SIEM) systems and data. FIG. 13 depicts an embodiment of top-level components and interfaces illustrating system boundaries and external devices. Preferably the external systems 1311A and 1311B provide data to server 630 without an MA. The boundaries of what is an external device may shift from event to event or during an event. FIG. 14 depicts an embodiment of the system including the sub-components described herein.

Figure 12:
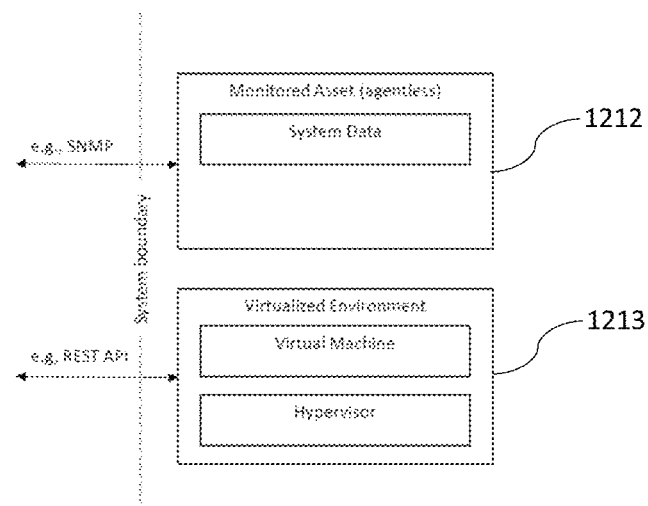
FIG. 12 is a schematic of an embodiment of non-agent approaches for collection of data from monitored assets.

In addition, the system preferably uses a similar mechanism to collect Simple Network Management Protocol (SNMP) data. The system preferably also collects information on virtual devices through its Virtualized Environment Collection capability. The Virtualized Environment Collection capability allows the system to monitor computing devices that are realized as Virtual Machines (VM). Furthermore, preferably the system can track multiple simulations running on the same device and the device itself simultaneously and independently. Preferably, the system can track both real and virtual assets at the same time. In addition, the system preferably collects system information from MAs through agentless methods. Examples include Simple Network Management Protocol (SNMP) 1212 and a hypervisor REST API 1213 for virtualized environments, see FIG. 12.

Event Assessment

The system preferably assembles time-based data from an event and provides site, event, and MA status by time and a report of anomalies and out of tolerance activities based on the data. The system preferably produces an Event Assessment view of the data collected from the event and provides both summary and detailed information as specified by the user. A default Event Assessment view can also be provided as a report in a standard file format (such as Microsoft Word). A user can tailor this default view to focus on specific attributes of the event as required. The Event Assessment highlights anomalies and provides correlating or cascading effects of failures. An example of a correlated or cascading anomaly is the failure of a network switch causing the loss of data traffic from an application downstream of the switch.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A method for monitoring distributed computing assets during events, comprising the steps of:
   determining a set of assets to be monitored during an event, wherein the monitored assets comprise at least one physical asset and at least one simulated asset;
   defining parameters for the event, wherein the parameters are at least one of a new set of parameters or based on parameters from a previous event;
   receiving status data from each monitored asset during the event;
   determining if each monitored asset's status is within the defined parameters during the event, which comprises determining if each monitored asset's status is at or above or at or below a threshold for the parameters, below or above the threshold for the parameters but within an acceptable range below or above the threshold, or exceeding the acceptable range below or above the threshold; providing different indication for each monitored asset;
   providing an indication to a user if a monitored asset's status is not within the defined parameters;
   receiving instructions from the user for each monitored asset not within of the defined parameters;
   transmitting the instructions to the monitored asset not within of the defined parameters;
   executing the instructions on the monitored asset outside of the defined parameters; and
   providing an assessment of the event after the event concludes.

2. The method of claim 1, wherein the event is a simulated training event.

3. The method of claim 1, wherein the monitored assets are at least one of computers, laptops, desktops, rack-mounted, virtualized, or Internet of Things (IoT) devices, smartphones, tablets, network devices, software-defined radios, unmanned aerial vehicles (UAVs), ground control stations, tactical solutions, training solutions, software applications, network devices, and data transmission devices.

4. The method of claim 1, wherein the parameters include at least one of what and when monitored assets are involved in the event, specifications of each monitored asset, what each monitored asset should be doing during the event, how the monitored assets communicate, central processing unit (CPU) utilization, memory utilization, hardware performance, software performance, and data file and application version information.

5. The method of claim 1, further comprising installing data gathering agents on each monitored asset.

6. The method of claim 1, further comprising testing each monitored asset prior to each event.

7. The method of claim 1, further comprising monitoring network data.

8. The method of claim 7, further comprising monitoring for and reporting at least one of out of bounds system performance, incorrect data, potential cybersecurity issues, unexpected data on the network, and unexpected IP addresses.

9. The method of claim 1, wherein the assessment of the event includes at least one of number of times and/or durations a monitored asset exceeded some parameters, and trends for events, sites, or monitored assets.

10. The method of claim 9, wherein the assessment is organized by at least one of overall event, by site, and by individual monitored asset.

11. The method of claim 1, further comprising providing different indications for each monitored asset below the threshold for the parameters but within an acceptable range below the threshold, and each monitored asset exceeding the acceptable range below the threshold.

12. The method of claim 1, further comprising displaying event information to the user.

13. The method of claim 12, wherein the event information includes at least one of status and trends of events, sites, and monitored assets, geographical locations of sites, events currently in the database, event participant locations, and network diagrams.

14. The method of claim 1, wherein the data is at least one of Security Information and Event Management (SIEM) data, Simple Network Management Protocol (SNMP) data, High Level Architecture (HLA) data, Distributed Interactive Simulation (DIS) data, and Data Distribution System (DDS) data.

15. The method of claim 1, wherein the instructions include at least one of starting or stopping a process or application, installing software updates, and steps to remedy monitored asset outside of the defined parameters.

16. The method of claim 1, wherein the method is a cloud-based deployment or an on-site deployment.

17. Non-transitory computer readable media for monitoring distributed computing assets during events, the computer readable media directing a central processor to:
determine a set of assets to be monitored during an event, wherein the monitored assets comprise at least one physical asset and at least one simulated asset;
define parameters for the event, wherein the parameters are at least one of a new set of parameters or based on parameters from a previous event;
receive status data from each monitored asset during the event;
determine if each monitored asset's status is within the defined parameters during the event, which comprises determining if each monitored asset's status is at or above or at or below a threshold for the parameters, below or above the threshold for the parameters but within an acceptable range below or above the threshold, or exceeding the acceptable range below or above the threshold; providing different indication for each monitored asset;
provide an indication to a user if a monitored asset's status is not within the defined parameters;
receive instructions from the user for each monitored asset not within of the defined parameters;
transmit the instructions to the monitored asset not within of the defined parameters; and
provide an assessment of the event after the event concludes.

18. The non-transitory computer readable media of claim 17, wherein the event is a simulated training event.

19. The non-transitory computer readable media of claim 17, wherein the monitored assets are at least one of computers, laptops, desktops, rack-mounted, virtualized, or Internet of Things (IoT) devices, smartphones, tablets, network devices, software-defined radios, unmanned aerial vehicles (UAVs), ground control stations, tactical solutions, training solutions, software applications, network devices, and data transmission devices.

20. The non-transitory computer readable media of claim 17, wherein the parameters include at least one of what and when monitored assets are involved in the event, specifications of each monitored asset, what each monitored asset should be doing during the event, how the monitored assets communicate, central processing unit (CPU) utilization, memory utilization, hardware performance, software performance, and data file and application version information.

21. The non-transitory computer readable media of claim 17, wherein the computer readable media further directs the central processor to install data gathering agents on each monitored asset.

22. The non-transitory computer readable media of claim 17, wherein the computer readable media further directs the central processor to test each monitored asset prior to each event.

23. The non-transitory computer readable media of claim 17, wherein the computer readable media further directs the central processor to monitor network data.

24. The non-transitory computer readable media of claim 23, wherein the computer readable media further directs the central processor to monitor for and report at least one of out of bounds system performance, incorrect data, potential cybersecurity issues, unexpected data on the network, and unexpected IP addresses.

25. The non-transitory computer readable media of claim 17, wherein the assessment of the event includes at least one of number of times and/or durations a monitored asset exceeded some parameters, and trends for events, sites, or monitored assets.

26. The non-transitory computer readable media of claim 25, wherein the assessment is organized by at least one of overall event, by site, and by individual monitored asset.

27. The non-transitory computer readable media of claim 17, wherein the computer readable media further directs the central processor to provide different indications for each monitored asset below the threshold for the parameters but within an acceptable range below the threshold, and each monitored asset exceeding the acceptable range below the threshold.

28. The non-transitory computer readable media of claim 17, wherein the computer readable media further directs the central processor to display event information to the user.

29. The non-transitory computer readable media of claim 28, wherein the event information includes at least one of status and trends of events, sites, and monitored assets, geographical locations of sites, events currently in the database, event participant locations, and network diagrams.

30. The non-transitory computer readable media of claim 17, wherein the data is at least one of Security Information and Event Management (SIEM) data, Simple Network Management Protocol (SNMP) data, High Level Architecture (HLA) data, Distributed Interactive Simulation (DIS) data, and Data Distribution System (DDS) data.

31. The non-transitory computer readable media of claim 17, wherein the instructions include at least one of starting or stopping a process or application, installing software updates, and steps to remedy monitored asset outside of the defined parameters.

32. A system for monitoring distributed computing assets during events, comprising:
a plurality of monitored assets, each monitored asset adapted to transmit the monitored asset's status information data and receive instructions during an event, wherein the plurality of monitored assets comprise at least one physical asset and at least one simulated asset;
a central processing unit adapted to receive status information data from each monitored asset and send instructions to each monitored asset during the event;
software executing on the central processing unit, wherein the software:
defines parameters for the event, wherein the parameters are at least one of a new set of parameters or based on parameters from a previous event;
receives status data from each monitored asset during the event;
determines if each monitored asset's status is within the defined parameters during the event, which comprises determining if each monitored asset's status is at or above or at or below a threshold for the parameters, below or above the threshold for the parameters but within an acceptable range below or above the threshold, or exceeding the acceptable range below or above the threshold; providing different indication for each monitored asset;
provides an indication to a user if a monitored asset's status is not within the defined parameters;
receives instructions from the user for each monitored asset not within of the defined parameters;
transmits the instructions to the monitored asset not within of the defined parameters; and
provides an assessment of the event after the event concludes.

33. The system of claim 32, wherein the event is a simulated training event.

34. The system of claim 32, wherein the monitored assets are at least one of computers, laptops, desktops, rack-mounted, virtualized, or Internet of Things (IoT) devices, smartphones, tablets, network devices, software-defined radios, unmanned aerial vehicles (UAVs), ground control stations, tactical solutions, training solutions, software applications, network devices, and data transmission devices.

35. The system of claim 32, wherein the parameters include at least one of what and when monitored assets are involved in the event, specifications of each monitored asset, what each monitored asset should be doing during the event, how the monitored assets communicate, central processing unit (CPU) utilization, memory utilization, hardware performance, software performance, and data file and application version information.

36. The system of claim 32, wherein the software installs data gathering agents on each monitored asset.

37. The system of claim 32, wherein the software tests each monitored asset prior to each event.

38. The system of claim 32, wherein the software monitors network data.

39. The system of claim 38, wherein the software monitors for and reports at least one of out of bounds system performance, incorrect data, potential cybersecurity issues, unexpected data on the network, and unexpected IP addresses.

40. The system of claim 32, wherein the assessment of the event includes at least one of number of times and/or durations a monitored asset exceeded some parameters, and trends for events, sites, or monitored assets.

41. The system of claim 40, wherein the assessment is organized by at least one of overall event, by site, and by individual monitored asset.

42. The system of claim 32, wherein the software provides different indications for each monitored asset below the threshold for the parameters but within an acceptable range below the threshold, and each monitored asset exceeding the acceptable range below the threshold.

43. The system of claim 42, wherein the software displays event information to the user.

44. The system of claim 43, wherein the event information includes at least one of status and trends of events, sites, and monitored assets, geographical locations of sites, events currently in the database, event participant locations, and network diagrams.

45. The system of claim 32, wherein the data is at least one of Security Information and Event Management (SIEM) data, Simple Network Management Protocol (SNMP) data, High Level Architecture (HLA) data, Distributed Interactive Simulation (DIS) data, and Data Distribution System (DDS) data.

46. The system of claim 32 wherein the instructions include at least one of starting or stopping a process or application, installing software updates, and steps to remedy monitored asset outside of the defined parameters.

* * * * *